Figures 1, 2:
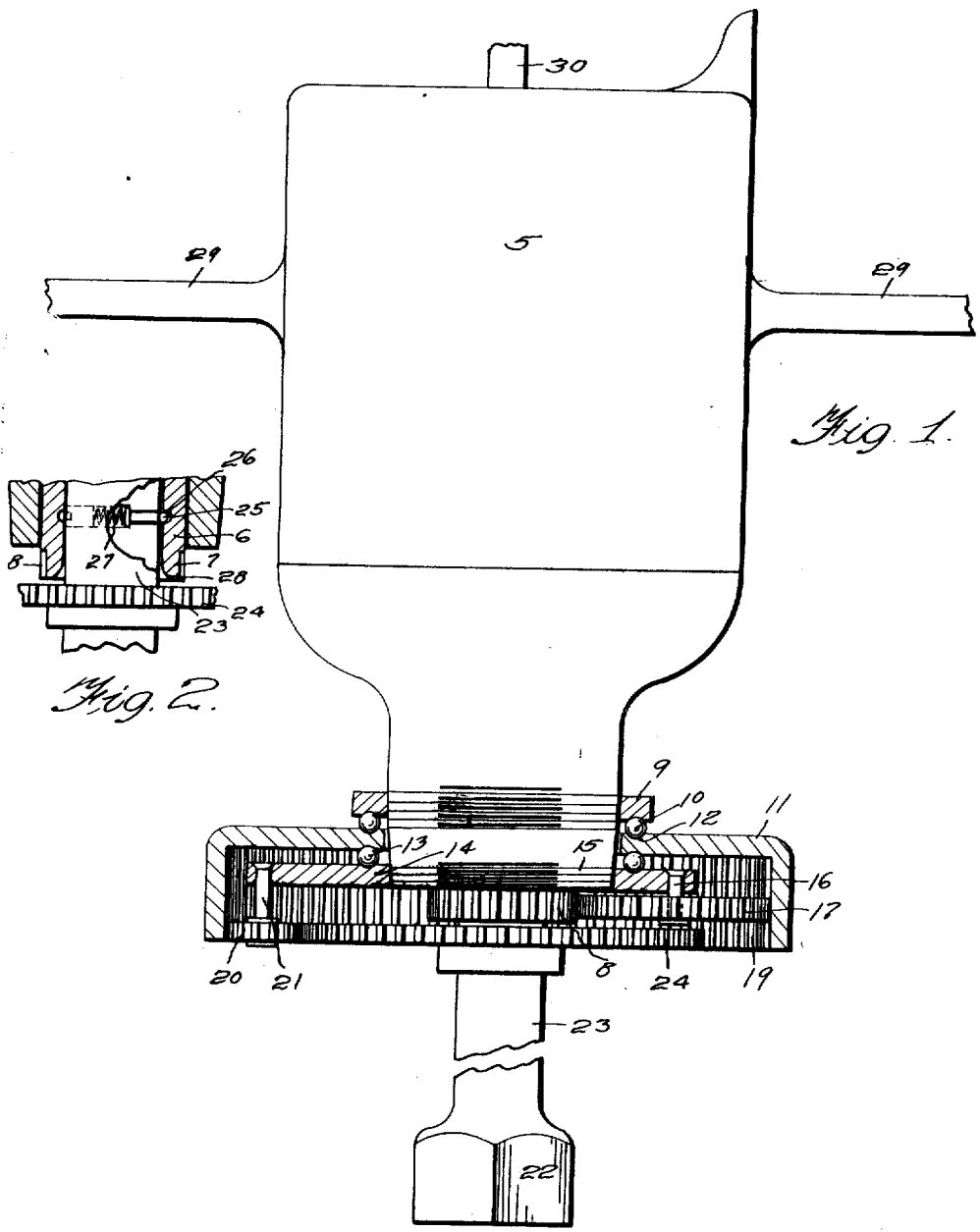

J. RATZ.
BOLTING UP DEVICE.
APPLICATION FILED OCT. 8, 1921.

1,405,739.

Patented Feb. 7, 1922.

INVENTOR
John Ratz
By Shepherd & Campbell
ATTORNEYS.

UNITED STATES PATENT OFFICE.

JOHN RATZ, OF FORT HOWARD, MARYLAND.

BOLTING-UP DEVICE.

1,405,739.

Specification of Letters Patent.   Patented Feb. 7, 1922.

Application filed October 8, 1921. Serial No. 506,413.

*To all whom it may concern:*

Be it known that I, JOHN RATZ, a citizen of the United States, residing at Fort Howard, in the State of Maryland, have invented certain new and useful Improvements in Bolting-Up Devices, of which the following is a specification, reference being had therein to the accompanying drawings.

This invention relates to bolting up devices particularly intended for use in ship yards and it has for its object to provide a simple and inexpensive structure by means of which a very large saving in the cost of the bolting up operation may be effected.

In the building of steel ships it is necessary to bolt the plates of which the hull of the ship is constructed to the frame work of the vessel to properly position the plates before the rivets are put in place. This bolting of the plates in position consumes a great deal of time and represents a very large item of the ultimate cost of the vessel. The present invention contemplates the provision of a device actuated by an ordinary pneumatic drill or reamer adapted to run the nuts upon the bolts with great rapidity.

In the handling of a device of this character the work is greatly facilitated if the socket which engages the nut is in axial alinement with body of the casing of the machine so that the "aiming" of the socket to cause it to engage the nut will be accurate and under the complete control of the operator.

Further objects and advantages of the invention will be set forth in the detailed description which follows.

In the accompanying drawing:

Figure 1 is a view partly in side elevation and partly in vertical section of a machine constructed in accordance with the invention; and Fig. 2 is a fragmentary sectional view through the driven element of of the pneumatically operable drill or reamer.

In the drawing 5 designates the body of an ordinary pneumatic drill or reamer. These drills or reamers, as ordinarly constructed, comprise a rotative socketed element 6 the lower end of which projects slightly below the lower end of the casing 5, as indicated at 7 and as ordinarly used, this socketed element 6 receives the tapered shanks of the drills or reamers.

In carrying out the invention, I provide the portion 7 of the socketed element 6 which projects below the casing 5 with gear teeth 8 and I thread upon the casing 5 a collar 9 which constitutes one of the elements of a ball race for the reception of antifriction balls 10. A cup-shaped internal gear 11 is provided with a groove 12 for the reception of the balls 10. Additional antifriction balls 13 bear between the internal gear 11 and a fixed bearing plate 14 which is screwed upon threads 15 formed on the casing 5. The bearing plate 14 carries a stub shaft 16 and this stub shaft in turn carries a gear wheel 17 which meshes with the gear teeth 8 and with the teeth 19 of the internal gear 11. The teeth of the internal gear mesh additionally with a pinion 20 which is mounted to rotate upon a stub shaft 21, the latter being carried by the bearing plate 14. A nut engaging socket 22 carried by a shank 23 has rotation imparted thereto through the medium of a large gear wheel 24 which meshes with the pinion 20. Thus if the pneumatic tool be energized in the usual way, the rotative element 6 will, through the gear teeth 8, impart rotation to gear wheel 17. This will impart rotation to the internal gear 11 and the movement of the latter will be transmitted through pinion 20 and gear wheel 24 to the shank 23, it being apparent that these elements as a whole constitute a reducing gearing which imparts a relatively slow and powerful movement to the socket 22 from the high speed rotative element 6. In order to hold the shank 23 against longitudinal movement with respect to the rotative element 6, while permitting rotation of these elements with respect to each other, I mount in the upper end of the shank 23 a plug 25 the rounded outer end of which is adapted to snap into an annular recess 26 formed in the rotative member 6 under the influence of a spring 27. Thus a sharp endwise pull upon the shank 23 will result in the removal of the shank and the gear 24 carried thereby and permit the substitution of another shank in lieu thereof, adapted to engage nuts of a different size. In inserting such substitute shanks the end of the detent plug 25 is forced inwardly by engaging with the beveled portion 28 at the lower end of the rotative member 6 but snaps outwardly into the recess 26 when it reaches a position of alinement with said recess.

From the foregoing description it will be seen that the present invention provides means for utilizing compressed air tools already on the market with a minimum of change in the construction of the latter, for the purpose indicated, the mechanism being such as to impart the necessary powerful turning movement to the nut, while at the same time the sockets are maintained in axial alinement with the casing 5 of the tool, for the purpose indicated.

Shanks of any desired length may be used and in bolting up decks it is frequently the case that shanks in excess of 20 inches in length are used. To aid in the proper handling of the structure, elongated handles 29 are provided, these being in addition to the usual handle of the tool, indicated at 30. This permits of the manipulation of the structure by two men, when desired.

It is to be understood that the invention is not limited to the precise construction set forth but that it includes within its purview whatever changes fairly come within either the terms or the spirit of the appended claims.

Having described my invention what I claim is:

1. In combination a compressed air tool comprising a casing and a tubular driven member therein, a socket carrying shank disposed in axial alinement with said casing and guided in and rotative with respect to said driven member, and a train of gearing between said shank and said driven member for reducing the rate of speed of rotation of the shank with respect to said member.

2. A device of the character described comprising a pneumatic tool including a rotative socketed element axially disposed within said casing and having gear teeth formed directly thereon at its lower end, a socket carrying shank axially alined with the rotative element and guided and held against longitudinal movement in said rotative element but rotative with respect thereto, a gear wheel carried by said shank, and a train of reducing gearing between the last-named gear wheel and the gear teeth of the rotative element.

3. A pneumatic tool comprising a casing, a tubular rotative element axially disposed therein and constituting a part thereof, gear teeth formed upon said rotative element outside of said casing, a cup-like internal gear encircling the outside of said casing the axis of which is coincident with the axis of the casing, a gear wheel meshing with the gear teeth of the rotative member and with the teeth of the internal gear, a socket carrying shank guided in and held against longitudinal movement with respect to the tubular rotative element, a gear wheel carried by the socket carrying shank, and a gear wheel disposed between and meshing with the teeth of the internal gear and the teeth of the gear wheel that is carried by the socket carrying shank.

4. A device of the character described comprising a casing, a collar carried by said casing, an internal cup-like gear, antifriction balls between said cup-like gear and the collar, a fixed bearing plate threaded upon the casing and disposed inside of the internal gear, antifriction balls between the bearing plate and the cup-like gear, stub shafts carried by the bearing plate, a rotative element axially disposed within said casing and having gear teeth formed thereon at its lower end, a gear wheel carried by one of said stub shafts and meshing with the gear teeth of the rotative element and with the gear teeth of the internal gear, a socket carrying shank, a gear wheel carried by said socket carrying shank and a gear wheel carried by the other of the stub shafts which meshes with the last named gear wheel and with the teeth of the internal gear.

In testimony whereof I hereunto affix my signature.

JOHN RATZ.